(12) United States Patent
Fricke-Schmidt

(10) Patent No.: US 9,090,236 B2
(45) Date of Patent: Jul. 28, 2015

(54) VALVE CARTRIDGE FOR A MAGNET VALVE, AND A CORRESPONDING MAGNET VALVE

(75) Inventor: Joerg Fricke-Schmidt, Charleston, SC (US)

(73) Assignee: Robert Bosch GmbH, Stuttgart (DE)

( * ) Notice: Subject to any disclaimer, the term of this patent is extended or adjusted under 35 U.S.C. 154(b) by 387 days.

(21) Appl. No.: 13/377,125

(22) PCT Filed: Apr. 7, 2010

(86) PCT No.: PCT/EP2010/054587
§ 371 (c)(1),
(2), (4) Date: Feb. 23, 2012

(87) PCT Pub. No.: WO2010/142476
PCT Pub. Date: Dec. 16, 2010

(65) Prior Publication Data
US 2012/0145935 A1    Jun. 14, 2012

(30) Foreign Application Priority Data
Jun. 9, 2009   (DE) .......................... 10 2009 026 850

(51) Int. Cl.
*F16K 31/02* (2006.01)
*F16K 15/04* (2006.01)
(Continued)

(52) U.S. Cl.
CPC ................. *B60T 8/363* (2013.01); *B60T 8/365* (2013.01); *B60T 8/3615* (2013.01)

(58) Field of Classification Search
CPC ....... F16K 31/06; F16K 31/062; F16K 31/60; B60T 8/365
USPC ......... 251/129.02, 129.15, 48, 50; 137/601.2, 137/601.21, 550
See application file for complete search history.

(56) References Cited

U.S. PATENT DOCUMENTS

| | | | | |
|---|---|---|---|---|
| 5,879,060 A | * | 3/1999 | Megerle et al. | ............ 303/119.2 |
| 6,189,985 B1 | * | 2/2001 | Fritsch et al. | .............. 303/119.2 |

(Continued)

FOREIGN PATENT DOCUMENTS

| | | |
|---|---|---|
| DE | 101 04 241 A1 | 8/2002 |
| DE | 10 2007 053 134 A1 | 5/2009 |

(Continued)

OTHER PUBLICATIONS

International Search Report corresponding to PCT Application No. PCT/EP2010/054587, mailed Jun. 23, 2010 (German and English language document) (4 pages).

*Primary Examiner* — Marina Tietjen
*Assistant Examiner* — Seth W Mackay-Smith
(74) *Attorney, Agent, or Firm* — Maginot Moore & Beck LLP

(57) ABSTRACT

A valve cartridge for a magnet valve includes a capsule, a valve core, a valve body, a lower valve part and a flat filter. The valve core has a first end and a second end. The first end is inserted into the capsule. The valve body has a main valve seat. The valve body is inserted into the second end. The lower valve part is axially supported on the valve core and includes a nonreturn valve. The nonreturn valve includes a nonreturn valve seat and a nonreturn valve closing element. The flat filter has an inserted filter screen for filtering dirt particles. The filter screen is connected to the lower valve part. The nonreturn valve seat is placed in the lower valve part. An opening stroke of the nonreturn valve closing element is limited by an abutment contour arranged on the flat filter level with the filter screen.

13 Claims, 4 Drawing Sheets

(51) Int. Cl.
*F16K 15/18* (2006.01)
*B60T 8/36* (2006.01)

(56) References Cited

U.S. PATENT DOCUMENTS

| | | | | |
|---|---|---|---|---|
| 6,254,199 | B1 * | 7/2001 | Megerle et al. | 303/119.2 |
| 6,382,250 | B1 * | 5/2002 | Gruschwitz et al. | 137/601.14 |
| 6,846,408 | B2 * | 1/2005 | Knight | 210/171 |
| 7,243,899 | B2 * | 7/2007 | Acar et al. | 251/129.07 |
| 2008/0203343 | A1 * | 8/2008 | Kratzer | 251/129.15 |
| 2010/0264342 | A1 * | 10/2010 | Heyer et al. | 251/129.15 |

FOREIGN PATENT DOCUMENTS

| | | |
|---|---|---|
| EP | 1 101 678 A1 | 5/2001 |
| WO | WO 2008058802 A1 * | 5/2008 |
| WO | WO 2009059845 A1 * | 5/2009 |

* cited by examiner

VALVE CARTRIDGE FOR A MAGNET VALVE, AND A CORRESPONDING MAGNET VALVE

BACKGROUND

This application is a 35 U.S.C. §371 National Stage Application of PCT/EP2010/054587, filed Apr. 7, 2010, which claims the benefit of priority to Application Serial No. DE 10 2009 026 850.2, filed Jun. 9, 2009 in Germany, the disclosures of which are incorporated herein by reference in their entirety.

The disclosure relates to a valve cartridge for a magnet valve of the type claimed in independent patent claim 1, and to an associated magnet valve.

A conventional magnet valve, in particular for a hydraulic unit, which is used in an anti-lock braking system (ABS) or an anti-slip regulation system (ASR system) or an electronic stability program system (ESP system) for example, is illustrated in FIGS. 1 and 2. As can be seen from FIGS. 1 and 2, the conventional magnet valve 1, which is embodied as a control valve which is open when deenergized for example, comprises a magnet subassembly 5 for producing a magnetic flux, said assembly comprising a housing jacket 5.1, a winding carrier 5.2, a coil winding 5.3 and a covering washer 5.4, and a valve cartridge 2, which comprises a capsule 2.1, a valve core 8, a first end of which is inserted into the capsule 2.1, a magnet armature 4 having a plunger 6, and a return spring 7. In the production of the conventional magnet valve 1, the capsule 2.1 and the valve core 8 of the valve cartridge are fitted one on top of the other by pressing, and the valve cartridge 2 is sealed off hydraulically from the atmosphere by a sealing weld 2.2. In addition, the valve core 8 absorbs the pressure forces which arise in the hydraulic system and transmits them via a caulking flange 8.1 to a caulking region 41 of a fluid block 40.

When the coil winding 5.3 is energized by way of electric terminals 5.5, the magnet subassembly 5 produces a magnetic force, which moves the longitudinally movable magnet armature 4 with the plunger 6, which comprises a closing element 6.1 with a main sealing element 6.2, toward the valve core 8 against the force of the return spring 7, with the plunger 6 and the return spring 7 being guided in an internal bore of the valve core 8. The valve core 8 conducts the magnetic flux introduced via the covering washer 5.4 by the magnet subassembly 5 axially via an air gap 5.6 in the direction of the magnet armature 4. Moreover, a second end of the valve core 8 receives what is referred to as the valve body 9, which comprises a main valve seat 9.1, into which the main sealing element 6.2, which is designed as a spherical sealing cap, enters in a sealing manner in order to implement the sealing function of the magnet valve 1. In the magnet valve 1 illustrated, an integrally molded annular filter 3 having a carrier element 3.1 and a filter element 3.2 for filtering dirt particles is furthermore designed/mounted in such a way that associated sealing locations 3.3, 3.4 are arranged directly between the annular filter 3 and the magnet valve 1 in order to avoid bypasses. In this arrangement, the annular filter 3 provides an axial seal relative to the valve core 8 by way of an upper sealing location 3.3, and provides a radial seal with respect to the adjoining component, in this case a lower valve part 10, by way of a lower sealing location 3.4.

As can furthermore be seen from FIGS. 1 and 2, the lower valve part 10 is placed and supported axially against the valve core 8, said lower valve part comprising a nonreturn valve 10.1 arranged eccentrically with respect to the main valve axis and having a nonreturn valve seat 10.2 and a nonreturn valve closing element 10.3. The lower valve part 10, which is embodied as a plastic insert for example, additionally serves to provide a seal with respect to the surrounding fluid block 40, to provide a seal with respect to the valve body 9 and to receive a flat filter 11 having an inserted screen 11.2. In this arrangement, the nonreturn valve seat 10.2 is placed in the lower valve part 10, and an opening stroke 10.5 of the nonreturn valve closing element 10.3, which in this case is embodied as a ball, is limited by an abutment contour 10.4 arranged on the flat filter 11.

As can furthermore be seen from FIGS. 1 and 2, the abutment contour 10.4 for the nonreturn valve closing element 10.3 is arranged above the inserted filter screen 11.2 on the flat filter 11. Thus, either the opening stroke 10.5 of the nonreturn valve closing element 10.3 or an axial tolerance compensation length 11.4 is reduced by the dimension of a wall thickness 11.3 of the abutment contour 10.4. As a result, it is difficult to obtain optimum volume flows at the nonreturn valve 10.1 or to implement new design concepts for the magnet valve (sleeve system) with greater axial tolerance compensation possibilities. To obtain the axial tolerance compensation length 11.4, feet 11.1 of predetermined length 11.5 are formed integrally on the flat filter 11. It must be taken into account here that it is not possible to use the full length 11.5 of the flat filter feet 11.1 for axial tolerance compensation since upset material of the flat filter feet 11.1 remains in the region of tolerance compensation. The plastic flat filter 11 is connected to the adjoining lower valve part 10 in order to enable assembly and handling of the complete magnet valve 1 in production. In the magnet valve design illustrated, an annular web on the flat filter 11 enters a circumferential annular groove in the lower valve part 10. In this case, the annular web is radially compressed partially or in part in the annular groove to hold it captive.

SUMMARY

In contrast, the valve cartridge according to the disclosure for a magnet valve, having the features of independent patent claim 1, has the advantage that an abutment contour for the non-return valve closing element is arranged at the level of the filter screen inserted in the flat filter. By virtue of this arrangement of the abutment contour, it is both possible to make an opening stroke of the non-return valve closing element as large as possible in order to be able to satisfy flow rate requirements and, at the same time, to achieve optimum functioning of an axial tolerance compensation in the flat filter, thus enabling as large as possible axial variations in travel to be absorbed by the flat filter. Embodiments according to the disclosure ensure that the opening stroke of the non-return valve closing element or the axial tolerance compensation is advantageously no longer reduced by the dimension of the wall thickness of the abutment contour. It is thereby advantageously possible to obtain additional space for the upset material of feet of the flat filter during axial tolerance compensation.

The essential advantage of the valve cartridge according to the disclosure is that the redesign of the lower part of the valve and of the flat filter in a manner which is optimized in terms of installation space makes it possible to implement a cost-saving magnet valve that employs a sleeve system. By virtue of its design, this kind of magnet valve has larger axial tolerances in the lower region of the magnet valve, and these can be compensated for in the design through the arrangement according to the disclosure of the abutment contour.

A magnet valve according to the disclosure comprises a magnet subassembly and a valve cartridge according to the disclosure having a capsule, a valve core, a first end of which is inserted into the capsule and the other end of which receives a valve body having a main valve seat, a lower valve part, which is axially supported on the valve core, and a non-return valve comprising a non-return valve seat and a non-return valve closing element, wherein a flat filter having an inserted filter screen for filtering dirt particles is connected to the lower valve part, and wherein the non-return valve seat is placed in the lower valve part, and wherein an opening stroke of the non-return valve closing element is limited by an abutment contour arranged on the flat filter, which contour is arranged at the level of the filter screen inserted in the flat filter, wherein a magnet armature is guided movably within the valve cartridge, said armature being movable by a magnetic force produced by the magnet subassembly and moving a plunger guided within the valve core, said plunger having a closing element with a sealing element, wherein the sealing element enters the main valve seat of the valve body in a sealing manner in order to perform a sealing function. In principle, embodiments of the disclosure can be employed for all magnet valves that are open when de-energized or closed when de-energized.

Advantageous improvements of the valve cartridge disclosed in the independent patent claim are possible by means of the measures and developments presented in the dependent claims.

It is particularly advantageous that the flat filter has at least one filter foot with a predetermined filter foot length. In this case, the at least one filter foot can be upset for axial tolerance compensation. The upset material of the at least one filter foot is received by a compensating space arranged underneath the filter screen, for example. Moreover, a length of the compensating space includes a wall thickness of the abutment contour of the nonreturn valve closing element. Thus, in addition, more space is obtained for the upset material of the flat filter feet during axial tolerance compensation, this space corresponding to the dimension of the wall thickness of the abutment contour. It is thereby advantageously possible to implement novel magnet valve concepts, e.g. a sleeve system, which can be produced more cheaply but require greater axial tolerance compensation possibilities.

As a development of the valve cartridge according to the disclosure, the lower valve part is embodied as a plastic injection molding having a substantially constant wall thickness. The constant wall thickness in the lower valve part makes it possible to avoid flaws (voids) in the plastic component produced by injection molding, and it is possible to optimize cycle times in the production of the lower valve part, i.e. cycle times of an injection process in the injection molding die for the lower valve part.

As a further development of the valve cartridge according to the disclosure, the valve core is embodied as a one-piece slotted sleeve, and the valve body is embodied as a hood-shaped sleeve, which is pressed in such a way into a second end of the valve core embodied as a slotted sleeve that the main valve seat is arranged within the valve core. As a result, the valve core and the valve body can advantageously be produced by low-cost methods while maintaining the same valve cartridge performance. Thus, the valve core, which is embodied as a one-piece slotted sleeve, can be produced by rolling up a sheet-metal strip for example, and the valve body can be produced as a hood-shaped deep-drawn part for example.

As a further development of the valve cartridge according to the disclosure, the capsule is embodied as a valve component which forms a seal with respect to the atmosphere and is caulked to the fluid block in a caulking region by means of a caulking bush. As a result, the capsule also assumes the sealing function, once the valve cartridge has been caulked in the fluid block. Since the capsule also assumes the sealing function with respect to the outside from the valve core, it is advantageously possible to simplify the assembly of the valve and, as a result, a sealing weld between the capsule and the valve core is no longer necessary.

Advantageous embodiments of the disclosure, which are described below, and the conventional illustrative embodiments, explained above for a better understanding thereof, are illustrated in the drawings. In the drawings, identical reference signs denote components or elements which perform the same or analogous functions.

DETAIL DESCRIPTION

Figure 1:
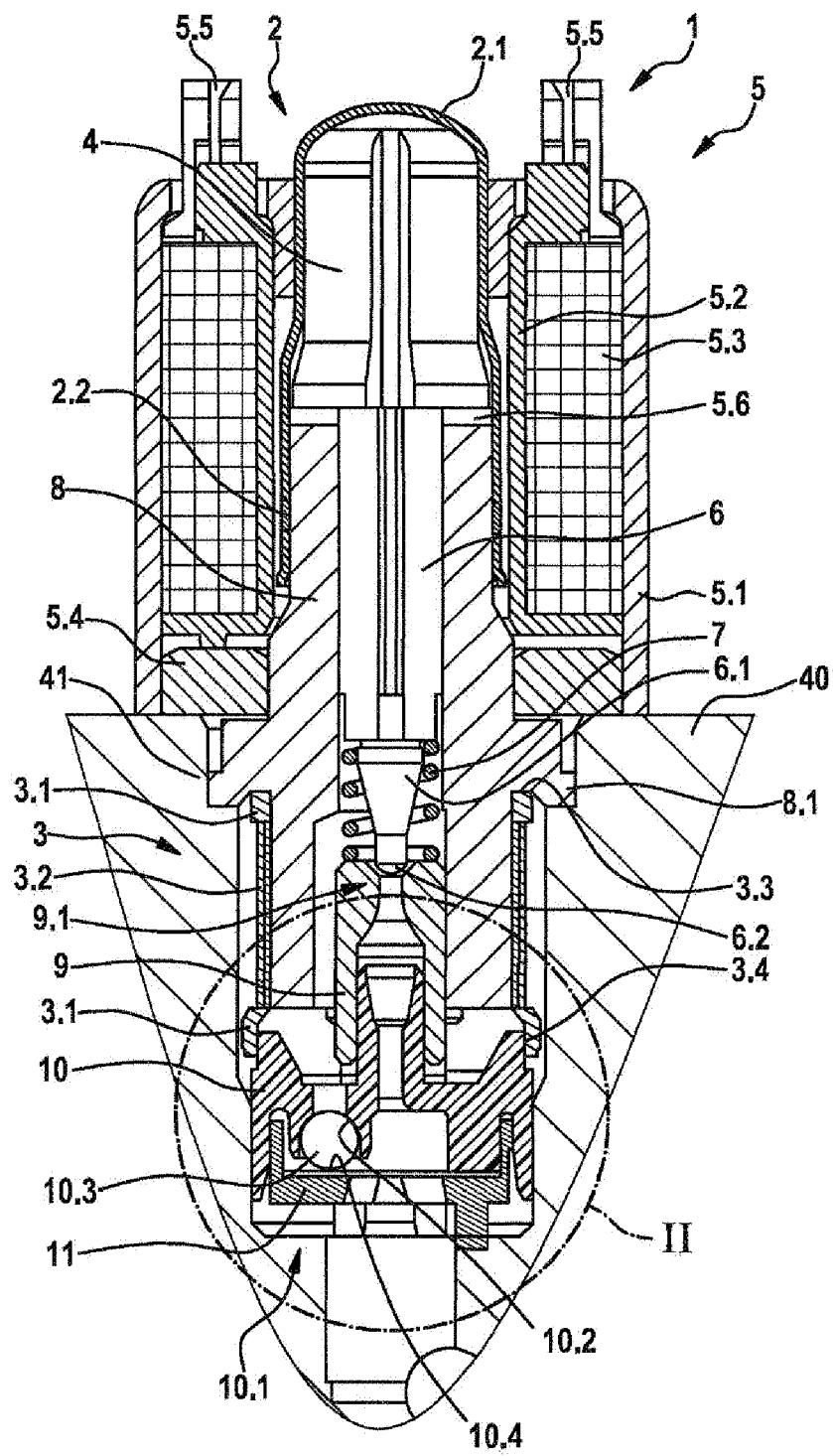
FIG. 1 shows a schematic sectional representation of a conventional magnet valve.
Figure 2:
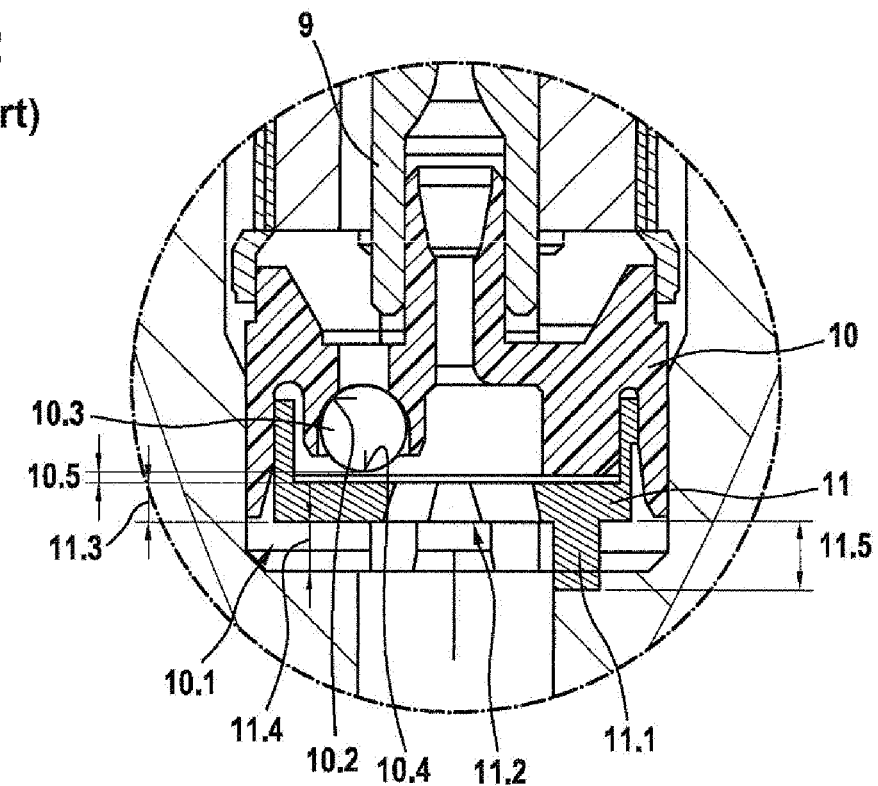
FIG. 2 shows a detailed sectional representation of a portion of the conventional magnet valve from FIG. 1.
Figure 3:
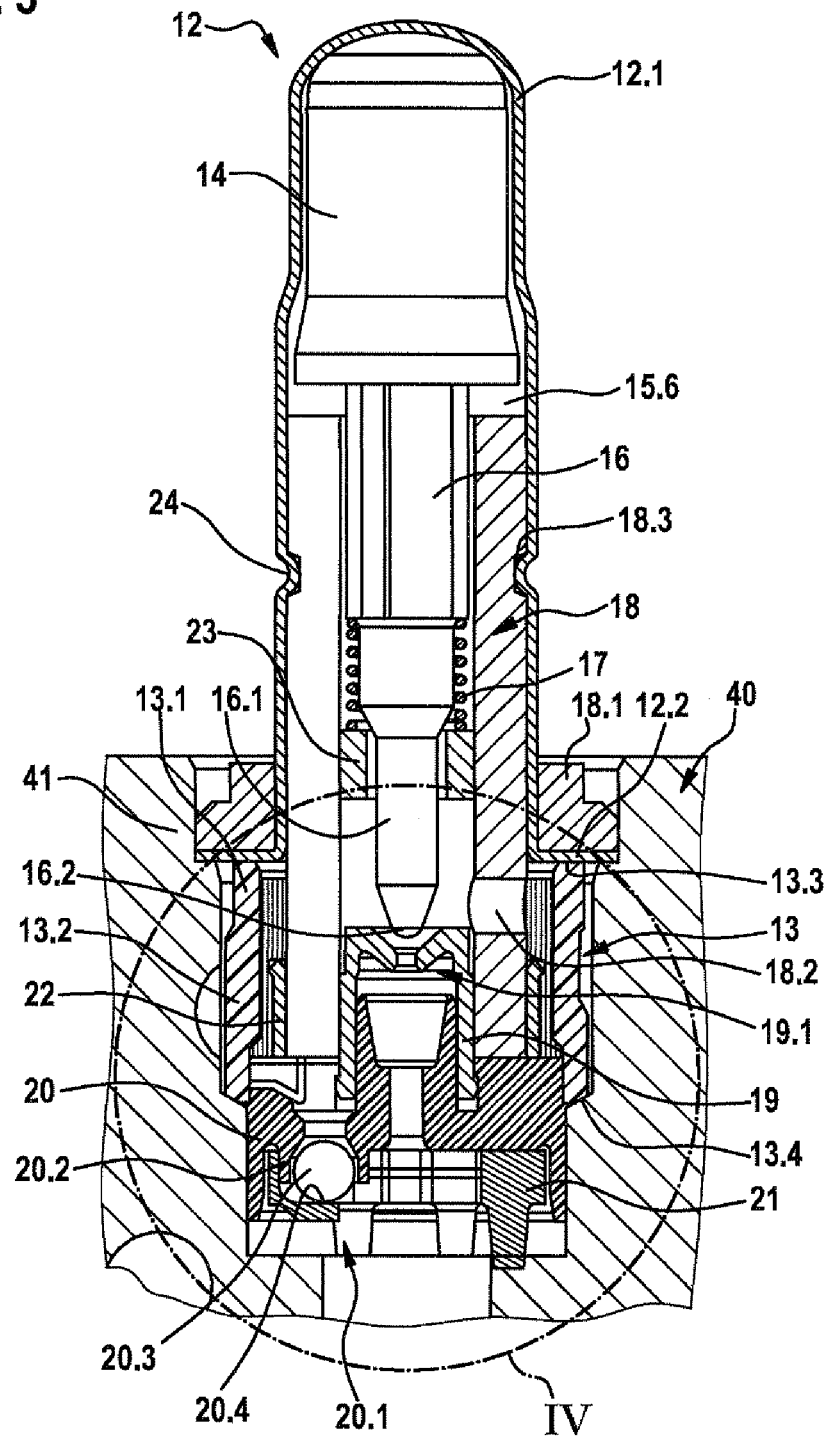
FIG. 3 shows a schematic sectional representation of an illustrative embodiment of a valve cartridge according to the disclosure for a magnet valve.
Figure 4:
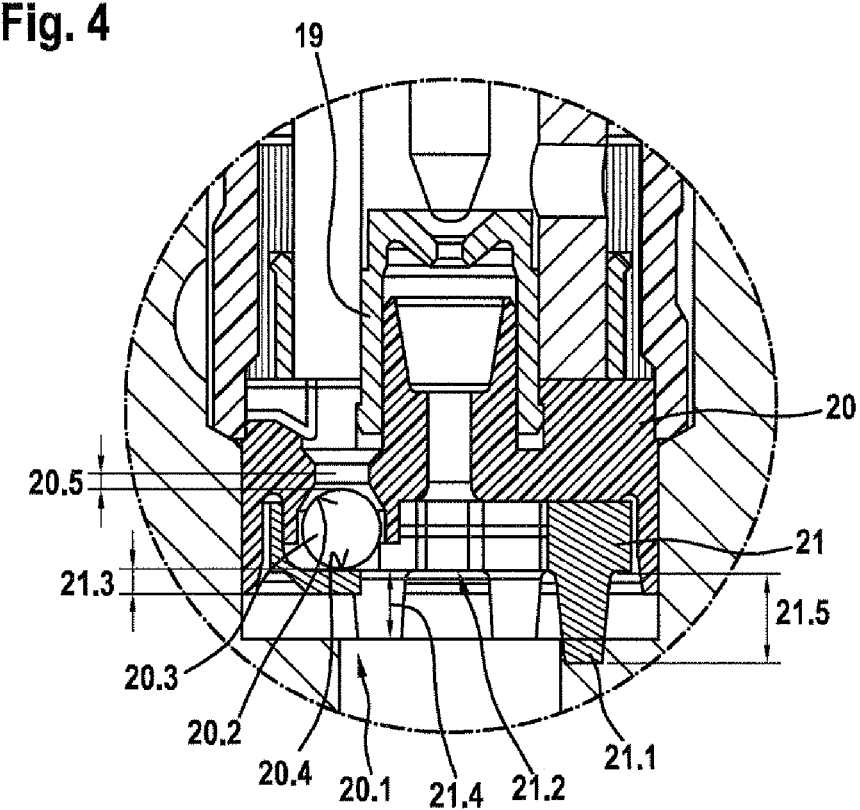
FIG. 4 shows a detailed sectional representation of a portion of the valve cartridge according to the disclosure from FIG. 3.

As can be seen from FIGS. 3 and 4, an illustrative embodiment of a valve cartridge 12 according to the disclosure for a magnet valve comprises a capsule 12.1, a magnet armature 14 guided movably within the capsule 12.1, a valve core 18, a first end of which is inserted into the capsule 12.1, and a valve body 19 having a main valve seat 19.1. Guided in a longitudinally movable manner within the valve core 18 is a plunger 16, which has a closing element 16.1 having a sealing element 16.2, which enters the main valve seat 19.1 of the valve body 19 in a sealing manner in order to perform a sealing function. The plunger 16 can be moved within the valve core 18 by the magnet armature 14, against the force of a return spring 17, wherein the magnet armature 14 is moved by a magnetic force produced by a magnet subassembly that is not shown. The magnet subassembly can be embodied in a manner similar to the magnet subassembly 5 of the conventional magnet valve 1 in accordance with FIG. 1, for example.

As can furthermore be seen from FIG. 3, the capsule 12.1 is embodied as a valve component that forms a seal with respect to the atmosphere and is extended in the direction of the caulking region 41 with respect to a fluid block 40. The caulking forces are therefore no longer absorbed by the valve core 18 but by a caulking bush 18.1. The caulking geometry is optimized to such an extent that it is possible to introduce a caulking process that permits a reduced caulking force; as a result, it is possible to reduce the deformation forces acting on the caulking bush 18.1 and the capsule 12.1. Moreover, the valve core 18 is embodied as a one-piece slotted sleeve. The valve core 18 embodied as a one-piece slotted sleeve can be produced by rolling up a sheet-metal strip, for example. In the illustrative embodiment illustrated, an internal bore of the valve core 18 has a perfectly circular or very nearly circular shape, in which the plunger 16 is guided. To compensate for the volume which the plunger 16 displaces during its axial movement brought about by the magnetic flux introduced by the magnet subassembly, and for the purpose of bleeding and filling, at least one axially extending volume compensation groove is machined into the plunger 16. As an alternative, however, it is also possible for the at least one volume compensation groove to be machined into the internal bore of the valve core 18. In an alternative embodiment (not shown) of the valve cartridge according to the disclosure, it is possible, for example, for at least one axially extending volume compensation groove to be machined into the valve core 18 and to be defined by the shape of the internal bore of the valve core.

As can furthermore be seen from FIGS. 3 and 4, the valve body 19 is embodied as a hood-shaped sleeve. The valve body 19 embodied as a sleeve is embodied as a deep-drawn part, for example, and is pressed in such a way into a second end of the valve core 18 embodied as a slotted sleeve, over a press-fitting region, that the main valve seat 19.1 is arranged within the valve core 18. By means of a decoupling region, the main valve seat 19.1 in the valve body 19 is decoupled from the press-fitting region in order to prevent deformation of the main valve seat 19.1 by the process of pressing the valve body 19 into the valve core 18.

The hydraulic forces are absorbed by the valve seat 18 embodied as a slotted sleeve. In order to prevent expansion of the valve core 18 by the pressing in of the valve body 19, a reinforcing ring 22 is pressed onto the second end of the valve core 18 in the illustrative embodiment illustrated. The pressed-on reinforcing ring 22 advantageously increases the form stability of the valve core 18 as the valve body 19 is pressed in. In an alternative embodiment (not shown) of the valve cartridge 12 according to the disclosure, the abutting surfaces of the valve core 18 embodied as a slotted sleeve can be connected to one another, at least at the second end of the valve core 18, in order to increase the form stability of the valve core 18 as the valve body 19 is pressed in. The abutting surfaces of the valve core 18 embodied as a slotted sleeve can be connected to one another by welding and/or adhesive bonding and/or toothing, for example.

In the illustrative embodiment illustrated of the valve cartridge 12 according to the disclosure, a maximum stroke of the plunger 16 can be set by shifting the valve core 18 axially within the capsule 12.1. A minimum air gap 15.6 between the magnet armature 14 and the valve core 18 can be set by shifting the valve body 19 axially within the valve core 18 with the armature 14 inserted. The air gap 15.6 set can be fixed by means of a crimped joint 24 between the capsule 12.1 and the valve core 18, and it is possible for the valve core 18 to be embodied with a circumferential groove 18.3 for the production of the crimped joint 24. The crimped joint 24 thus ensures that the working air gap 15.6 is maintained and, in addition, the hydraulically acting forces can be absorbed. To increase the axial retention forces of the crimped joint between the capsule 12.1 and the valve core 18, the shape of the circumferential groove 18.3 can be geometrically modified and adapted.

As can furthermore be seen from FIG. 3, the return spring 17 for the plunger 16 is arranged outside the region of flow, and the return spring 17 is supported on a spring support 23 which, in the illustrative embodiment illustrated, is embodied as a clamping sleeve introduced into the valve core 18. By relocating the return spring 17 out of the installation space through which flow occurs, the wear on the plunger 16 can be reduced and the flow rate between the main valve seat 19.1 and corresponding radial holes 18.2 introduced into the valve core 18 can be increased.

As can furthermore be seen from FIG. 3 or 4, a lower valve part 20 embodied as a plastic insert is placed and supported on the valve core 18, wherein the lower valve part 20 is inserted into an interior space of the valve body 19 in a sealing manner by way of a dome and, with the outer contour, forms a seal relative to the surrounding fluid block 40. An annular filter 13 with a carrier element 13.1 and a filter element 13.2 for filtering dirt particles is attached in a sealing manner to the valve cartridge 12. The annular filter 13 is embodied as a plastic injection molding with an upper sealing location 13.3 and a lower sealing location 13.4. In this arrangement, the upper sealing location 13.3 provides an axial seal for a filtered fluid flow with respect to the collar 12.2 formed integrally on the capsule 12.1. The lower sealing location 13.4 provides an axial seal for the filtered fluid flow with respect to the fluid block 40 in which the valve cartridge 12 is caulked. Moreover, the lower valve part 20 illustrated comprises an eccentrically arranged nonreturn valve 20.1 having a nonreturn valve seat 20.2 and a nonreturn valve closing element 20.3, which is embodied as a ball, for example, and performs a directional flow function. In addition, the lower valve part 20 accommodates a flat filter 21 having a plurality of filter feet 21.1, which have a predetermined length 21.5, and an inserted screen 21.2. In this arrangement, the nonreturn valve seat 20.2 is introduced into the lower valve part 20, and an opening stroke 20.5 of the nonreturn valve closing element 20.3 is limited by an abutment contour 20.4 arranged on the flat filter 21. As can furthermore be seen from FIGS. 3 and 4, the abutment contour 20.4 for the nonreturn valve closing element 20.3 is arranged on the flat filter 21 at the level of the inserted screen 21.2. This eliminates the deficiency of the conventional designs, that is to say that the opening stroke of the nonreturn valve closing element 20.3 or a length 21.4 of a compensating region for axial tolerance compensation is no longer reduced by the dimension of a wall thickness 21.3 of the abutment contour 20.4. In the illustrative embodiment illustrated, more space, corresponding to the dimension of the wall thickness 21.3 of the abutment contour 20.4 of the nonreturn valve closing element 20.3, is thus additionally obtained during axial tolerance compensation for the upset material of the flat filter feet 21.1, while maintaining the same opening stroke 20.5 of the nonreturn valve closing element 20.3. As a result, it is advantageously possible to obtain optimum volume flows at the nonreturn valve 20.1 and/or to implement the new design concept for the magnet valve (sleeve system) with greater axial tolerance compensation possibilities. To obtain the axial tolerance compensation length 21.4, the feet 21.1 formed integrally on the flat filter 21 have the predetermined length 21.5, although it must be noted that it is not possible to use the full length 21.5 of the flat filter feet 21.1 for axial tolerance compensation since the upset material of the flat filter feet 21.1 remains in the region of tolerance compensation. The plastic flat filter 21 is connected to the adjoining lower valve part 20 in order to enable assembly and the handling of the complete magnet valve in production. In the magnet valve design illustrated, appropriate retaining means for connecting the flat filter 21 to the lower valve part 20 eliminate the need for a C-shaped web, used hitherto in the conventional lower valve part 10, and a circumferential annular web, used for fastening, on the conventional flat filter 11. This redesign of the lower valve part 20 and of the flat filter 21 in a manner which is optimized in terms of installation space makes it possible to save additional axial installation space in the lower region of the magnet valve. The circumferential annular groove in the lower valve part 20, the length of which groove is greatly reduced, is no longer used for the retaining function of the flat filter 21. The clamped connection between the flat filter 21 and the lower valve part 20 can be obtained by means of retaining tabs arranged on the flat filter 21, for example, said tabs entering corresponding groove segments in the lower valve part 20 and thus each establishing a partial clamped connection.

The essential advantage of the disclosure consists in that the redesign of the lower valve part 20 and of the flat filter 21 in a manner which is optimized in terms of installation space allows a cost-saving embodiment of the valve cartridge 12 using a sleeve system. The design of the embodiment of the valve cartridge 12 using a sleeve system entails larger axial tolerances in the lower region of the magnet valve, it being possible to compensate for these axial tolerances by design measures, inter alia by the arrangement according to the disclosure of the abutment contour 20.4 and the inserted screen 21.2.

The valve cartridge according to the disclosure makes possible a major simplification of individual components and it is therefore also possible in an advantageous way to simplify the corresponding production processes and to carry them out more economically. Moreover, the sleeve-type construction of the valve cartridge according to the disclosure may advantageously result in a reduced overall height of the magnet valve above the fluid block, and this may have a positive effect on the unit box volume. Moreover, the overall height of the magnet valve within the fluid block may also be reduced, thereby making it possible to reduce the thickness of the fluid block and therefore resulting in possible further advantages in respect of weight and unit box volume.

The invention claimed is:

1. A valve cartridge for a magnet valve comprising:
   a capsule;
   a valve body having a main valve seat;
   a valve core having a first end inserted into the capsule and a second end configured to receive the valve body;
   a lower valve part axially supported on the valve core, the lower valve part including a nonreturn valve with a nonreturn valve seat and a nonreturn valve closing element, the nonreturn valve seat being formed in the lower valve part;
   a flat filter connected to the lower valve part, the flat filter defining an abutment contour with an upper surface configured to directly contact the nonreturn valve closing element so as to limit an opening stroke of the nonreturn valve closing element; and
   a filter screen disposed in the flat filter and configured to filter dirt particles passing therethrough, the filter screen being positioned in the flat filter such that (i) an upper surface of the filter screen is separate from and arranged level with the upper surface of the abutment contour and (ii) an outer periphery of the filter screen abuts an inner radius of the abutment contour.

2. The valve cartridge as claimed in claim 1, wherein the flat filter has at least one filter foot with a predetermined filter foot length.

3. The valve cartridge as claimed in claim 2, wherein material of the at least one filter foot is configured to be upset for axial tolerance compensation.

4. The valve cartridge as claimed in claim 3, wherein:
   the abutment contour defines an abutment contour wall thickness, and
   a compensating space is arranged underneath the filter screen and is configured to accommodate the upset material of the at least one filter foot, the compensating space including a compensating space length that includes substantially all of the abutment contour wall thickness.

5. The valve cartridge as claimed in claim 4, further comprising a fluid block defining an internal bore into which the valve cartridge is partially inserted, wherein:
   a bore length is defined from an upper surface of the fluid block to the end of the bore,
   a valve core distance is defined from the upper surface of the fluid block to the second end of the valve core,
   a lower valve part thickness is defined from an upper surface of the lower valve part adjacent the valve core to a lower surface of the lower valve part adjacent the flat filter,
   a screen distance is defined from an upper surface of the flat filter adjacent the lower surface of the lower valve part to underneath the filter screen, and
   the compensating space length is further defined as the difference between the bore length and the sum of the valve core distance, the lower valve part thickness, and the screen distance.

6. The valve cartridge as claimed in claim 1, wherein the lower valve part is configured as a plastic injection molding having a substantially constant wall thickness.

7. The valve cartridge as claimed in claim 1, wherein the valve core is configured as a one-piece slotted sleeve, and the valve body is configured as a hood-shaped sleeve, and wherein the valve body is pressed into the second end of the valve core such that the main valve seat is arranged within the valve core.

8. The valve cartridge as claimed in claim 1, further comprising:
   a fluid block; and
   a caulking bush, wherein the capsule is configured as a valve component which forms an atmospheric seal and is caulked directly to the fluid block in a caulking region via the caulking bush.

9. The valve cartridge as claimed in claim 1, wherein the flat filter is connected to the lower valve part via a retention mechanism.

10. The valve cartridge as claimed in claim 9, wherein the retention mechanism includes at least one retaining tab configured to operatively engage a corresponding groove segment formed in the lower valve part.

11. The valve cartridge as claimed in claim 1, wherein:
    the abutment contour has a lower surface opposed to the upper surface of the abutment contour, and
    the filter screen has a lower surface opposed to the upper surface of the filter screen, the lower surface of the filter screen being offset from the lower surface of the abutment contour in a direction towards the nonreturn valve closing element.

12. The valve cartridge as claimed in claim 11, further comprising a fluid block defining an internal bore into which the valve cartridge is partially inserted, wherein:
    the internal bore has a bore end that faces the flat filter,
    the lower surface of the abutment contour and the bore end define a first compensating space length therebetween, and
    the lower surface of the filter screen and the bore end define a second compensating space length therebetween, the second compensating space length being greater than the first compensating space length.

13. A magnet valve comprising:
    a magnet subassembly producing a magnetic force;
    a magnetic armature movable by the magnetic force;
    a valve cartridge including:
       a capsule,
       a valve body having a main valve seat,
       a valve core having a first end inserted into the capsule and a second end configured to receive the valve body,
       a lower valve part axially supported on the valve core, the lower valve part including a nonreturn valve with a nonreturn valve seat and a nonreturn valve closing element, the nonreturn valve seat being formed in the lower valve part, a flat filter connected to the lower valve part, the flat filter defining an abutment contour with an upper surface configured to directly contact the nonreturn valve closing element so as to limit an opening stroke of the nonreturn valve closing element, and a filter screen disposed in the flat filter and configured to filter dirt particles passing therethrough, the filter screen being positioned in the flat filter such that (i) an upper surface of the filter screen is separate from and arranged level with the upper surface of the abutment contour and (ii) an outer periphery of the filter screen abuts an inner radius of the abutment contour; and a plunger having a closing element with a sealing element, the sealing element being configured to enter the main valve seat of the valve body in a sealing manner so as to perform a sealing function, wherein the magnet armature is guided movably within the valve cartridge and moves the plunger, which is guided within the valve core.

* * * * *